United States Patent
Richter et al.

[11] 3,843,717
[45] Oct. 22, 1974

[54] DIALKYLAMINOBENZHYDRYLDICARBOXYLATES

[75] Inventors: Sidney B. Richter; David P. Mayer, both of Chicago, Ill.

[73] Assignee: Velsicol Chemical Corporation, Chicago, Ill.

[22] Filed: Jan. 5, 1972

[21] Appl. No.: 215,668

Related U.S. Application Data

[62] Division of Ser. No. 867,891, Oct. 20, 1969, Pat. No. 3,655,731.

[52] U.S. Cl............. 260/472, 260/465 D, 260/470, 260/479 S, 260/482 R, 260/485 H, 260/485 J, 260/485 L, 424/304, 424/309, 424/311, 424/313
[51] Int. Cl......................................... C07c 103/32
[58] Field of Search....................... 260/472, 482 R

[56] References Cited
UNITED STATES PATENTS
3,586,709  6/1971  Richter et al...................... 260/472

Primary Examiner—Lorraine A. Weinberger
Assistant Examiner—L. A. Thaxton
Attorney, Agent, or Firm—Robert J. Schwarz; Dietmar H. Olesch

[57] ABSTRACT

This invention discloses new compounds of the formula

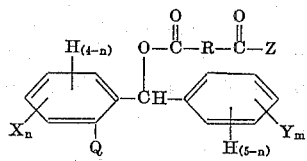

wherein X and Y are independently selected from the group consisting of alkyl, alkenyl, alkoxy, alkylthio, halogen, cyano, nitro and haloalkyl; Q is dialkylamino; R is an alkylene or alkenylene group of up to eight carbon atoms; $m$ and $n$ are each integers from 0 to 3; and Z is selected from the group consisting of hydroxy, alkoxy, haloalkoxy, amino, alkylamino, dialkylamino and

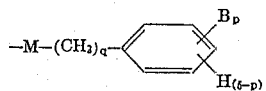

wherein M is selected from the group consisting of oxygen and —NH—; B is selected from the group consisting of alkyl, alkenyl, alkoxy, alkylthio, halogen, cyano, nitro and haloalkyl; and $q$ and $p$ are integers from 0 to 5. The compounds of the above description are useful as insecticides and acaricides.

1 Claim, No Drawings

DIALKYLAMINOBENZHYDRYLDICARBOXYLATES

This application is a Divisional of our Copending Application, Ser. No. 867,891, filed Oct. 20, 1969, now U.S. Pat. No. 3,655,731.

This invention relates to new compositions of matter and more particularly relates to new chemical compounds having the structural formula

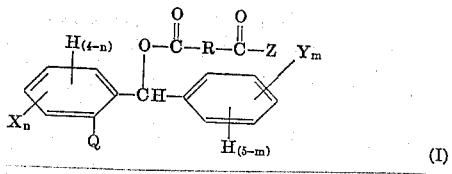

(I)

wherein X and Y are independently selected from the group consisting of alkyl, alkenyl, alkoxy, alkylthio, halogen, cyano, nitro and haloalkyl; Q is dialkylamino; R is an alkylene or alkenylene group of up to 8 carbon atoms; $m$ and $n$ are each integers from 0 to 3; and Z is selected from the group consisting of hydroxy, alkoxy, haloalkoxy, amino, alkylamino, dialkylamino and

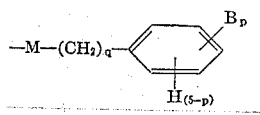

wherein M is selected from the group consisting of oxygen and —NH—; B is selected from the group consisting of alkyl, alkenyl, alkoxy, alkylthio, halogen, cyano, nitro and haloalkyl; and $q$ and $p$ are integers from 0 to 5.

In a preferred embodiment of this invention X and Y are independently selected from the group consisting of lower alkyl, lower alkenyl, lower alkoxy, cyano, lower alkylthio, chlorine, bromine, fluorine, nitro, lower chloroalkyl and trifluoromethyl; Q is di-(lower alkyl)-amino; R is an alkylene or alkenylene group of up to six carbon atoms; $m$ and $n$ are integers from 0 to 2; and Z is selected from the group consisting of hydroxy, lower alkoxy, lower chloroalkoxy, amino, lower alkylamino, di-(loweralkyl)-amino and

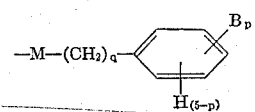

wherein M is selected from the group consisting of oxygen and —NH—; B is selected from the group consisting of lower alkyl, lower alkenyl, lower alkoxy, lower alkylthio, chlorine, bromine, fluorine, cyano, nitro lower chloroalkyl and trifluoromethyl; and $q$ and $p$ are integers from 0 to 3.

The term lower as used herein designated a straight or branched carbon chain of up to about eight carbon atoms.

The compounds of the present invention are unexpectedly useful as insecticides and acaricides.

The compounds of this invention can be readily prepared by reacting a benzhydrol of the formula

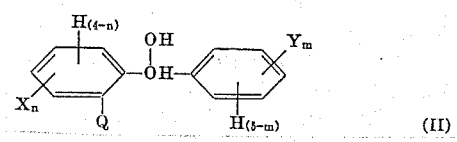

(II)

wherein X, Y, Q, $m$ and $n$ are as heretofore described, with about an equimolar amount of a dicarboxylic compound of the formula

(III)

wherein A is selected from the group consisting of hydroxy or halogen and preferably chlorine and R and Z are as heretofore described.

This reaction can be effected by combining equimolar amounts of the dicarboxylic compound of formula III with the benzhydrol of formula II in an inert organic reaction medium. The reaction mixture can then be stirred at elevated temperatures, up to the reflux temperature of the reaction mixture, for a period of from about ½ to about 8 hours. After this time the desired product can be recovered from the mixture by standard means such as decantation or filtration if the product forms as a precipitate or upon evaporation of the solvents used if the product is soluble therein.

When the substituent A in the compounds described by formula III is a halogen, in which case the dicarboxylic compound is an acid halide, it is preferred to utilize an acid acceptor in the reaction mixture to remove the hydrogen halide that is formed.

To prepare the compounds of the present invention wherein Z is a hydroxy group it can be advantageous to utilize the anhydride of the dicarboxylic compound of formula III when such is available. The use of anhydride as opposed to the dicarboxylic acid will obviate to a large extent the formation of the diester.

The compounds of this invention wherein Z is selected from the group consisting of alkoxy, haloalkoxy and

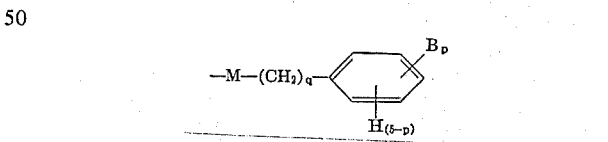

wherein M is oxygen and B, $q$ and $p$ are as heretofore described, can also be prepared from a compound of the present invention wherein Z is a hydroxy group by reaction with an alkanol, haloalkanol or an alcohol of the formula

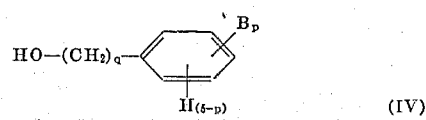

(IV)

wherein B, p and q are as heretofore described. This reaction can be readily carried out under standard esterification conditions. Azeotropic solvent methods are particularly suitable for this reaction.

The 2-dialkylaminobenzhydrol starting materials for preparing the compounds of the present invention can be prepared by several methods from the corresponding dialkylaminobenzophenone. For example, by reduction with lithium aluminum hydride. The dialkylaminobenzophenone can be prepared from the corresponding aminobenzophenone by alkylation procedures known to the art such as treatment with dimethyl sulfate, formic acid and formaldehyde, alkyl halides or alkenyl halides, and combinations thereof. In some cases the dialkylaminobenzophenone can be prepared from the corresponding halobenzophenone by reaction with dialkylamines such as N-methyl-N-ethylamine, N-methyl-N-isopropylamine, N-methyl-N-n-propylamine, N-methyl-N-n-butylamine, N-methyl-N-sec-butylamine, N-methyl-N-amylamine, N-ethyl-N-n-propylamine, N-ethyl-N-isopropylamine.

The aminobenzophenones can be readily prepared by the Friedel-Crafts reaction of a suitably substituted benzoyl chloride with aniline or a suitably substituted aniline. This reaction, well known in the art, can be carried out for example, by first heating a substituted benzoyl chloride to about 120° C and adding a substituted aniline thereto; then heating the reaction mixture to about 180° C and adding zinc chloride thereto; and finally reacting the mixture at about 220° C for a period of about ½ to about 2 hours. The product can be dissolved in an inorganic solvent, washed with organic base, dried and recovered by stripping of the solvent to yield a desired aminobenzophenone.

Exemplary suitable starting materials which can be used for preparing the compounds of this invention are benzhydrols such as 2-dimethylamino-5-chlorobenzhydrol, 2-diethylamino-5-bromobenzhydrol, 2-dipropylamino-4'-chlorobenzhydrol, 2-dibutylamino-5-chloro-2'-methylbenzhydrol, 2-dioctylamino-5-chloro-4'-methoxybenzhydrol, 2-dimethylamino-5-methoxybenzhydrol, 2-dimethylamino-4-nitrobenzhydrol, 2-dimethylamino-5-bromo-4'-isopropylbenzhydrol, 2-dimethylamino-5-chloro-4'-methylbenzhydrol and the like.

Suitable dicarboxylic compounds which can be used as starting materials for preparing the compounds of this invention are exemplified by maleic acid, succinic acid, glutaric acid, adipic acid, pemelic acid, suberic acid, azelaic acid, sebasic acid, succinic anhydride, glutaric anhydride, fumaric acid, maleic acid, mesaconic acid, citraconic acid, glutaconic acid, itaconic acid, maleic anhydride, and malonic acid.

EXAMPLE 1

Preparation of Methyl 2-Dimethylamino-5-chlorobenzhydryl Succinate

A mixture of 2-dimethylamino-5-chlorobenzhydrol (2.6 grams; 0.01 mol), monomethyl succinyl chloride (2 grams; 0.013 mol) pyridine (2 g.) and benzene (50 ml) was charged into a glass reaction vessel equipped with a mechanical stirrer, thermometer and reflux condenser. The reaction mixture was heated at reflux for a period of about 5 hours. After this time the reaction mixture was cooled and filtered to remove the pyridine hydrochloride which had formed. The filtrate was then washed first with 10 percent aqueous sodium hydroxide and then with water. The washed solution was then dried over magnesium sulfate and was filtered. The dried solution was then evaporated under reduced pressure on a steam bath to yield the desired product methyl 2-dimethylamino-5-chlorobenzhydryl succinate as a yellow viscous liquid.

EXAMPLE 2

Preparation of Methyl 2-Dimethylamino-5-chloro-2'-methylbenzhydryl Succinate

A mixture of 2-dimethylamino-5-chloro-2'-methylbenzhydrol (2.7 grams; 0.01 mol), monomethyl succinyl chloride (2 grams; 0.013 mol), triethylamine (2 g.) and benzene (50 ml.) was charged into a glass reaction vessel equipped with a mechanical stirrer, thermometer and reflux condenser. The reaction mixture was heated at reflux for a period of about 5 hours. After this time the reaction mixture was cooled and filtered to remove the triethylamine hydrochloride which had formed. The filtrate was then washed, first with 10 percent aqueous sodium hydroxide and then with water. The washed solution was dried over magnesium sulfate and was filtered. The filtered solution was then evaporated under reduced pressure on a steam bath to yield the desired product methyl 2-dimethylamino-5-chloro-2'-methylbenzhydryl succinate as a yellow viscous liquid.

EXAMPLE 3

Preparation of Ethyl 2-Di-n-propylamino-5-chlorobenzhydryl Succinate

A mixture of 2-di-n-propylamino-5-chlorobenzhydrol (3.2 grams; 0.01 mol), ethyl succinyl chloride (1.5 grams; 0.01 mol), triethylamine (2 grams) and benzene (100 ml.). is charged into a glass reaction vessel equipped with a mechanical stirrer, thermometer and reflux condenser. The reaction mixture is heated at reflux for a period of about 5 hours. After this time the reaction mixture is filtered to remove the triethylamine hydrochloride which has formed. The filtrate is then washed first with dilute aqueous sodium hydroxide and then with water. The washed solution is dried over anhydrous magnesium sulfate and is filtered. The filtrate is then evaporated under reduced pressure on a steam bath to yield the desired product ethyl 2-di-n-propylamino-5-chlorobenzhydryl succinate.

EXAMPLE 4

Preparation of Pentyl 2-Dimethylamino-5-bromobenzhydryl Succinate

A mixture of 2-dimethylamino-5-bromobenzhydrol (3.1 grams; 0.01 mol), pentyl succinyl chloride (2.1 grams; 0.011 mol), triethylamine (2 grams), and benzene (75 ml) is charged into a glass reaction vessel equipped with a mechanical stirrer, thermometer and reflux condenser. The reaction mixture is heated at reflux for a period of about 5 hours. After this time the reaction mixture is filtered to remove the triethylamine hydrochloride which has formed. The filtrate is then washed first with dilute aqueous sodium hydroxide and then with water. The washed solution is dried over anhydrous magnesium sulfate and is filtered. The resulting filtrate is then evaporated under reduced pressure on a steam bath to yield the desired product pentyl 2-dimethylamino-5-bromobenzhydryl succinate.

EXAMPLE 5

Preparation of 2-Dimethylamino-5-chlorobenzhydryl Maleate

A mixture of 2-dimethylamino-5-chlorobenzhydrol (5.2 grams; 0.02 mol), maleic anhydride (2 grams; 0.02 mol), and benzene (75 ml.) is charged into a glass reaction vessel equipped with a mechanical stirrer, thermometer and reflux condenser. The reaction mixture is heated at reflux for a period of about 5 hours. After this time the reaction mixture is evaporated under reduced pressure on a steam bath to yield the desired product 2-dimethylamino-5-chlorobenzhydryl maleate.

EXAMPLE 6

Preparation of Propyl 2-Dimethylamino-5-chlorobenzhydryl Maleate

A solution of 2-dimethylamino-5-chlorobenzhydryl maleate (3.2 grams; 0.01 mol) in methyl ethyl ketone (50 ml), pyridine (2.ml) and 1-bromopropane (1.2 grams; 0.01 mol) are charged into a glass reaction vessel equipped with a mechanical stirrer thermometer and reflux condenser. The reaction mixture is heated at reflux for a period of about 1 hour. After this time the mixture is cooled and filtered. The filtrate is then washed with water and dried over anhydrous magnesium sulfate. The dried solution is filtered and the filtrate is stripped of solvent under reduced pressure to yield the desired product propyl 2-dimethylamino-5-chlorobenzhydryl maleate as the residue.

EXAMPLE 7

Preparation of 2-Dimethylamino-5-methoxy-4'-chlorobenzhydryl Succinate

A mixture of 2-dimethylamino-5-methoxy-4'-chlorobenzhydrol (3 grams; 0.01 mol), succinic anhydride (1.2 grams; 0.012 mol), and benzene (50 ml) is charged into a glass reaction vessel equipped with a mechanical stirrer, thermometer and reflux condenser. The reaction mixture is heated for a period of about 3 hours. After this time the reaction mixture is evaporated under reduced pressure on a steam bath to yield the desired product 2-dimethylamino-5-methoxy-4'-chlorobenzhydryl succinate.

EXAMPLE 8

Preparation of Methyl 2-Dimethylamino-5-chloro-4'-trifluoromethylbenzhydryl Glutarate A mixture of 2-dimethylamino-5-chloro-4'-trifluoromethylbenzhydrol (3.3 grams; 0.01 mol), methyl glutaryl chloride (1.7 grams; 0.01 mol), triethylamine (2 grams), and benzene (75 ml) is charged into a glass reaction vessel equipped with a mechanical stirrer, thermometer and reflux condenser. The reaction mixture is heated at reflux for a period of about 5 hours. After this time the reaction mixture is filtered to remove the triethylamine hydrochloride which has been formed. The filtrate is then washed first with dilute aqueous sodium hydroxide and then with water. The washed solution is dried over anhydrous magnesium sulfate and is filtered. The dried solution is then evaporated under reduced pressure on a steam bath to yield the desired product methyl 2-dimethylamino-5-chloro-4'-trifluoromethylbenzhydryl glutarate.

EXAMPLE 9

Preparation of Methyl 2-Dimethylamino-5-methylthio-4'-nitrobenzhydryl Adipate

A mixture of 2-dimethylamino-5-methylthio-4'-nitrobenzhydrol (3.2 grams; 0.01 mol), methyl adipyl chloride (1.8 grams; 0.01 mol), triethylamine (2 grams), and benzene (75 ml) is charged into a glass reaction vessel equipped with a mechanical stirrer, thermometer and reflux condenser. The reaction mixture is heated at reflux for a period of about 5 hours. After this time the reaction mixture is filtered to remove the triethylamine hydrochloride which has formed. The filtrate is then washed first with dilute aqueous sodium hydroxide and then with water. The washed solution is dried over anhydrous magnesium sulfate and is filtered. The dried solution is then evaporated under reduced pressure on a steam bath to yield the desired product methyl 2-dimethylamino-5-methylthio-4'-nitrobenzhydryl adipate.

EXAMPLE 10

Preparation of Methyl 2-Dimethylamino-5-chloro-2'-methoxybenzhydryl Pimelate

A mixture of 2-dimethylamino-5-chloro-2'-methoxybenzhydrol (2.9 grams; 0.01 mol), methyl pimelyl chloride (1.9 grams; 0.01 mol), triethylamine (2 grams), and benzene (75 ml) is charged into a glass reaction vessel equipped with a mechanical stirrer, thermometer and reflux condenser. The reaction mixture is heated at reflux for a period of about 5 hours. After this time the reaction mixture is filtered to remove the triethylamine hydrochloride which has formed. The filtrate is then washed first with dilute aqueous sodium hydroxide and then with water. The washed solution is dried over anhydrous magnesium sulfate and is filtered. The dried solution is then evaporated under reduced pressure on a steam bath to yield the desired product methyl 2-dimethylamino-5-chloro-2'-methoxybenzhydryl pimelate.

EXAMPLE 11

Preparation of 2-Dimethylamino-5-chloro-4'-isopropylbenzhydryl N-Phenylsuccinamate A mixture of 2-dimethylamino-5-chloro-4'-isopropylbenzhydrol (3 grams; 0.01 mol), N-phenylsuccinamyl chloride (2.1 grams; 0.01 mol), triethylamine (2 grams), and benzene (75 ml) is charged into a glass reaction vessel equipped with a mechanical stirrer, thermometer and reflux condenser. The reaction mixture is heated at reflux for a period of about 5 hours. After this time the reaction mixture is filtered to remove the triethylamine hydrochloride which has formed. The filtrate is then washed first with dilute aqueous sodium hydroxide and then with water. The washed solution is dried over anhydrous magnesium sulfate and is filtered. The dried solution is then evaporated under reduced pressure on a steam bath to yield the desired product 2-dimethylamino-5-chloro-4'-isopropylbenzhydryl N-phenylsuccinamate.

EXAMPLE 12

Preparation of
2-Dimethylamino-5-chloro-4'-allylbenzhydryl
N-(3,4-dichlorophenyl)-succinamate A mixture of 2-dimethylamino-5-chloro-4'-allylbenzhydrol (3 grams; 0.01 mol), N-(3,4-dichlorophenyl)-succinamyl chloride (2.8 grams), triethylamine (2 grams), and benzene (75 ml) is charged into a glass reaction vessel equipped with a mechanical stirrer, thermometer and reflux condenser. The reaction mixture is heated at reflux for a period of about 5 hours. After this time the reaction mixture is filtered to remove the triethylamine hydrochloride which has formed. The filtrate is then washed first with dilute aqueous sodium hydroxide and then with water. The washed solution is dried over anhydrous magnesium sulfate and is filtered. The dried solution is then evaporated under reduced pressure on a steam bath to yield the desired product 2-dimethylamino-5-chloro-4'-allylbenzhydryl N-(3,4-dichlorophenyl)-succinamate.

EXAMPLE 13

Preparation of 2-Methyl-4-nitrophenyl
2-Dimethylamino-5-chloro-4'-pentylbenzhydryl
Succinate A mixture of 2-dimethylamino-5-chloro-4'-pentylbenzhydrol (3.3 grams; 0.01 mol), 2-methyl-4-nitrophenyl succinyl chloride (2.7 grams; 0.01 mol), triethylamine (2 grams), and benzene (75 ml) is charged into a glass reaction vessel equipped with a mechanical stirrer, thermometer and reflux condenser. The reaction mixture is heated at reflux for a period of about 5 hours. After this time the reaction mixture is filtered to remove the triethylamine hydrochloride which has formed. The filtrate is then washed first with dilute aqueous sodium hydroxide and then with water. The washed solution is dried over anhydrous magnesium sulfate and is filtered. The dried solution is then evaporated under reduced pressure on a steam bath to yield the desired product 2-methyl-4-nitrophenyl 2-dimethylamino-5-chloro-4'-pentylbenzhydryl succinate.

EXAMPLE 14

Preparation of 4-Methoxyphenyl
2-Dimethylamino-5-chloro-4'-nitrobenzhydryl
Succinate A mixture of 2-dimethylamino-5-chloro-4'-nitrobenzhydrol (3.1 grams; 0.01 mol), 4-methoxyphenyl succinyl chloride (2.5 grams; 0.01 mol), triethylamine (2 grams), and benzene (75 ml) is charged into a glass reaction vessel equipped with a mechanical stirrer, thermometer and reflux condenser. The reaction mixture is heated at reflux for a period of about 5 hours. After this time the reaction mixture is filtered to remove the triethylamine hydrochloride which has formed. The filtrate is then washed first with dilute aqueous sodium hydroxide and then with water. The washed solution is dried over anhydrous magnesium sulfate and is filtered. The dried solution is then evaporated under reduced pressure on a steam bath to yield the desired product 4-methoxyphenyl 2-dimethylamino-5-chloro-4'-nitrobenzhydryl succinate.

EXAMPLE 15

Citraconic anhydride + 2-di-n-pentylamino-5-chloro-4'-chloromethylbenzhydrol = 2-di-n-pentylamino-5-chloro-4'-chloromethylbenzhydryl citraconate.

EXAMPLE 16

Glutaconic acid + 2-dimethylamino-5-nitrobenzhydrol = 2-dimethylamino-5-nitrobenzhydryl glutaconate.

EXAMPLE 17

N-Methylsuccinamyl chloride + 2-dimethylamino-5-bromomethyl-4'-isopropoxybenzhydrol = 2-dimethylamino-5-bromomethyl-4-isopropoxybenzhydryl N-methylsuccinamate.

EXAMPLE 18

N,N-Dimethylsuccinamyl chloride + 2-dimethylamino-5-chloro-3'-butylthiobenzhydrol = 2-dimethylamino-5-chloro-3'-butylthiobenzhydryl N,N-dimethylsuccinamate.

EXAMPLE 19

2-Methoxy-4-methylphenyl succinyl chloride + 2-dimethylamino-5-chloro-4'-iodobenzhydrol = 2-dimethylamino-5-chloro-4'-iodobenzhydryl 2-methoxy-4-methylphenyl succinate.

EXAMPLE 20

2-Propyl-4-trifluoromethylphenyl succinyl chloride + 2-dimethylamino-5-chloro-3',4'-diiodobenzhydrol = 2-dimethylamino-5-chloro-3',4'-diiodobenzhydryl 2-propyl-4-trifluoromethylphenyl succinamate.

EXAMPLE 21

2,2,2-Trichloroethyl succinyl chloride + 2-dimethylamino-4-decyl-3'-pentyloxybenzhydrol = 2,2,2-trichloroethyl 2-dimethylamino-4-decyl-3'-pentyloxybenzhydryl succinate.

EXAMPLE 22

3-Allylphenyl succinyl chloride + 2-dimethylamino-5-pentyloxybenzhydrol = 3-allylphenyl 2-dimethylamino-5-pentyloxybenzhydryl succinate.

EXAMPLE 23

2-Methylthio-4-bromophenyl succinyl chloride + 2-dimethylamino-5-fluoro-3'-decyloxybenzhydrol = 2-methylthio-4-bromophenyl 2-dimethylamino-5-fluoro-3'-decyloxybenzhydryl succinate.

EXAMPLE 24

N,N-Dipropylsuccinamyl chloride + 2-didecylamino-5-decylthiobenzhydrol = 2-didecylamino-5-decylthiobenzhydryl N,N-dipropylsuccinamate.

EXAMPLE 25

N,N-Didecylsuccinamyl chloride + 2-dimethylamino-6-chloro-4'-γ-pentenyl benzhydrol = 2-dimethylamino-5-chloro-4'-γ-pentenyl benzhydryl N,N-didecylsuccinamate.

EXAMPLE 26

2-Chloromethyl-4-isopropoxyphenyl succinyl chloride + 2-dimethylamino-5-chlorobenzhydrol = 2-dimethylamino-5-chlorobenzhydryl 2-chloromethyl-4-isopropoxyphenyl succinate.

EXAMPLE 27

2-Pentyl-4-fluorophenyl succinyl chloride + 2-dimethylamino-5-chlorobenzhydrol = 2-dimethylamino-5-chlorobenzhydryl 2-pentyl-4-fluorophenyl succinate.

EXAMPLE 28

Isopropyl sebasyl chloride + 2-dimethylamino-5-chlorobenzhydrol = 2-dimethylamino-5-chlorobenzhydryl isopropyl sebasate.

EXAMPLE 29

Methyl suberyl chloride + 2-dimethylamino-5-chlorobenzhydrol = 2-dimethylamino-5-chlorobenzhydryl methyl suberate.

EXAMPLE 30

β-Bromoethyl adipyl chloride + 2-dimethylamino-5-chloro-4'-cyanobenzhydrol = 2-dimethylamino-5-chloro-4'-cyanobenzhydryl β-bromoethyl adipate.

For practical use as insecticides or acaricides, the compounds of this invention are generally incorporated into insecticidal or acaricidal compositions which comprise an inert carrier and an insecticidally or acaricidally toxic amount of such a compound. Such insecticidal or acaricidal compositions, which can also be called formulations, enable the active compound to be applied conveniently to the site of the insect or acarid infestation in any desired quantity. These compositions can be solids such as dusts, granules or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides or acaricides can be dispersed under superatmospheric pressure as aerosols. However, preferred liquid insecticidal or acaricidal compositions are emulsifiable concentrates, which comprises an active compound according to this invention and as the inert carrier, a solvent and an emulsifier. Such emulsifiable concentrates can be extended with water and/or oil to any desired concentration of active compound for application as sprays to the site of the insect or acarid infestation. The emulsifiers most commonly used in these concentrates are nonionic or mixtures of nonionic with anionic surface-active agents.

A typical insecticidal or acaricidal composition according to this invention is illustrated by the following example, in which the quantities are in parts by weight.

EXAMPLE 31

Preparation of a Dust

| Product of Example 1 | 10 |
|---|---|
| Powdered talc | 90 |

The above ingredients are mixed in a mechanical grinder-blender and are ground until a homogeneous, free-flowing dust of the desired particle size is obtained. This dust is suitable for direct application to the site of the insect or acarid infestation.

The compounds of this invention can be applied as insecticides or acaricides in any manner recognized by the art. One method for destroying insects or acarids comprises applying to the locus of the insect or acarid infestation, an insecticidal or acaricidal composition comprising an inert carrier and, as an essential active ingredient, in a quantity which is toxic to said insects or acarids, a compound of the present invention. The concentration of the new compounds of this invention in the insecticidal or acaricidal compositions will vary greatly with the type of formulation and the purpose for which it is designed, but generally the insecticidal or acaricidal compositions will comprise from about 0.05 to about 95 percent by weight of the active compounds of this invention. In a preferred embodiment of this invention, the insecticidal or acaricidal compositions will comprise from about 5 to 75 percent by weight of the active compound. The compositions can also comprise such additional substances as other pesticides, stabilizers, spreaders, deactivators, adhesives, stickers, fertilizers, activators, synergists, and the like.

The compounds of the present invention are also useful when combined with other insecticides or acaricides in the compositions heretofore described. These other insecticides or acaricides can comprise from about 5 to about 95 percent of the active ingredients in the compositions. Use of the combinations of these other insecticides or acaricides with the compounds of the present invention provides insecticidal and/or acaricidal compositions which are more effective in controlling insects or acarids and often provide results unattainable with separate compositions of the individual compounds. The other insecticides or acaricides with which the compounds of this invention can be used in the insecticidal or acaricidal compositions to control insects or acarids include halogenated compound such as DDT, methoxychlor, TDE, lindane, chlordane, isobenzan, aldrin, dieldrin, heptachlor, endrin, mirex, endosulfon, dicofol, and the like; organic phosphorus compounds such as TEPP, schradan, ethion, parathion, methyl parathion, EPN, demeton, carbophenothion, phorate, zinophos, diazinon, melathion, mevinphos, dimethoate, DBD, ronnel, oxydemeton-methyl, dicapthon, chlorothion, phosphamidon, naled, fenthion, trichlorofon, DDVP, ands the like; organic nitrogen compounds such as dinitro-o-cresol, dinitrocyclohexylphenol, DNB, DNP, binapacril, azobenzene, and the like; organic carbamate compounds such as carbaryl, ortho 5353, and the like; organic sulfur compounds such as phenothiazine, phenoxathin, lauryl thiocyanate, [bis(2-thiocyanoethyl)ether], isobornyl thiocyanoacetate, and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, paradichlorobenzene, and the like.

The compounds of the present invention can also be combined with fungicidal and nematocidal chemical compounds to form pesticidal compositions useful for the control of fungi and in some cases soil nematodes as well as insects or acarids. Typical examples of such fungicidal chemical compounds are ferbam, nabam, zineb, ziram, thiram, chloranil, dichlone, glyodin, cycloheximide, dinocap, maneb, captan, dodine, PCNB, p-dimethylaminobenzenediazo sodium sulfonate, and the like; while examples of nematocidal compounds are chloropicrin, O,O-diethyl O-(2,4-dichlorophenyl) phosphorothioate, tetrachlorothiophene, dazomet, dibromochloropropane, and the like.

The new compounds of this invention can be used in many ways for the control of insects or acarids. Insecticides or acaricides which are to be used as stomach poisons or protective materials can be applied to the surface on which the insects or acarids feed or travel. Insecticides or acaricides which are to be used as contact poisons or eradicants can be applied directly to the body of the insect or acarid, as a residual treatment to the surface on which the insect or acarid may walk or crawl, or as a fumigant treatment of the air which the insect or acarid breathes. In some cases, the compounds applied to the soil or plant surfaces are taken up by the plant, and the insects or acarids are poisoned systemically.

The above methods of using insecticides are based on the fact that almost all the injury done by insects is a direct or indirect result of their attempts to secure food. Indeed, the large number of destructive insects can be classified broadly on the basis of their feeding habits. Among the insects which can be effectively controlled by the compounds of the present invention are the chewing insects, such as the Mexican bean beetle and the southern armyworm; the piercing-uscking insects, such as the pea aphid, the cereal leaf beetle, the housefly, the grape leafhopper, the chinch bug, the lygus bug, the oyster shell scale, the California red scale, the Florida red scale, the soft scale and mosquitoes; the internal feeders, including borers, such as the European corn borer, the peach twig borer and the corn earworm, worms or weevils, such as the codling moth, the alfalfa weevil, the cotton boll weevil, the pink boll worm, the plum curculio, the red banded leaf roller, the melonworm, the cabbage looper and the apple maggot, leaf miners, such as the apple leaf miner, the birch leaf miner and the beet leaf miner, and gall insects, such as the wheat joint worm and the grape phylloxera. Insects which attack below the surface of the ground are classified as subterranean insects and include such destructive pests as the wooly apple aphid, the Japanese beetle, the onion maggot and the corn rootworm.

Mites and ticks are not true insects. Many economically important species of mites and ticks can be controlled by the compounds of this present invention, such as the red spider mite, the two-spotted mite, the strawberry spider mite, the citrus rust mite, the cattle tick, the poultry mite, the citrus red mite and the European red mite. Chemicals useful for the control of mites are often called miticides, while those useful for the control of both mites and ticks are known specifically as acaricides.

The quantity of active compound of this invention to be used for insect or acarid control will depend on a variety of factors, such as the specific insect involved, intensity of the infestation, weather, type of environment, type of formulation, and the like. For example, the application of only 1 or 2 ounces of active chemical per acre may be adquate for control of a light infestation of an insect or acarid under conditions unfavorable for its feeding, while a pound or more of active compound per acre may be required for the control of a heavy infestation of insects or acarids under conditions favorable to their development.

The insecticidal activity of the compounds of the present invention was demonstrated by experiments carried out for the control of a variety of insects.

In one experiment carried out for the control of the housefly, designated as the housefly topical test, each of 50 flies was contacted with a test compound by applying 1 ml of test formulation, containing a concentration of 3,500 ppm of active compound, to the dorsum of its thorax. The flies were then placed in a wire mesh cage where they were supplied with sugar syrup. At the end of a 24 hour period the mortality of the flies was observed and rated in comparison to a control. In this experiment the compound methyl 2-dimethylamino-5-chloro-2'-methylbenzhydryl succinate gave 98 percent control.

The insecticidal activity of the compounds of this invention was further illustrated in experiments carried out for the control of the pea aphid (*Acyrthosiphon pisum*) by contact. In this experiment 10-day old Laxton pea plants contained in small plastic pots were each infested with ten adult pea aphids. The plants and pea aphids were then sprayed with the test compound formulated as an aqueous emulsion of an acetone solution at 3,500 ppm. The infested plants were then placed in a holding chamber maintained at a constant temperature for a period of 48 hours. After this time the mortality of the aphids was determined and rated on a percent basis in comparison to a control. In this experiment the compound methyl 2-dimethylamino-5-chloro-2'-methylbenzhydryl gave 75 percent control of the pea aphid.

The acaricidal activity of the compounds of the present invention was demonstrated in experiments carried out for the control of the two-spotted spider mite (*Tetranychus urticae*).

In one experiment wherein the activity of the compounds of the present invention as contact poisons was determined, the test compound was formulated at the indicated dosages, as aqueous emulsions of acetone solutions and were sprayed onto Henderson bush lima bean plants, each infested with about 100 adult two-spotted spider mites. The treated plants were then placed into a holding room and were supplied with their daily requirement of water and light. After a period of 5 days the mortality of the mites was determined and was rated on a percentage basis in comparison to untreated control. The results of this experiment are shown in Table I.

TABLE I

| Test Compound | Concentration of Test Compound in ppm | % Mortality |
| --- | --- | --- |
| Production of Example 2 | 3500 | 95 |
| do. | 400 | 100 |
| do. | 100 | 88 |
| do. | 40 | 67 |
| do. | 10 | 61 |

We claim:

1. A compound of the formula

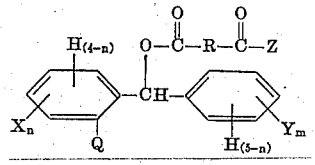

wherein X and Y are independently selected from the group consisting of lower alkyl, lower alkenyl, lower alkoxy, lower alkylthio, chlorine, bromine, fluorine, nitro lower chloroalkyl and trifluoromethyl; Q is di-(lower alkyl)amino; R is an alkylene or alkenylene group of up to eight carbon atoms; $m$ and $n$ are each integers from 0 to 3; and Z is selected from the group consisting of amino, lower alkylamino, di-(lower alkyl)amino and

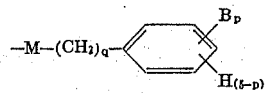

wherein M is —NH—; B is selected from the group consisting of lower alkyl, lower alkenyl, lower alkoxy, chlorine, bromine, fluorine, nitro, lower chloroalkyl and trifluoromethyl; and $q$ and $p$ are integers from 0 to 5.

* * * * *

UNITED STATES PATENT OFFICE
CERTIFICATE OF CORRECTION

PO-1050
(5/69)

Patent No. 3,843,717                    Dated   October 22, 1974

Inventor(s)   Sidney B. Richter and David P. Mayer

It is certified that error appears in the above-identified patent and that said Letters Patent are hereby corrected as shown below:

In column 2, lines 6 to 8, the portion of formula II appearing as

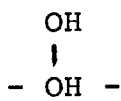

should read

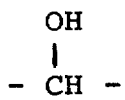

Signed and sealed this 11th day of March 1975.

(SEAL)
Attest:

RUTH C. MASON
Attesting Officer

C. MARSHALL DANN
Commissioner of Patents
and Trademarks